B. M. W. HANSON.
METAL REDUCING MACHINE.
APPLICATION FILED JUNE 8, 1916.
1,341,799.
Patented June 1, 1920.
6 SHEETS—SHEET 1.
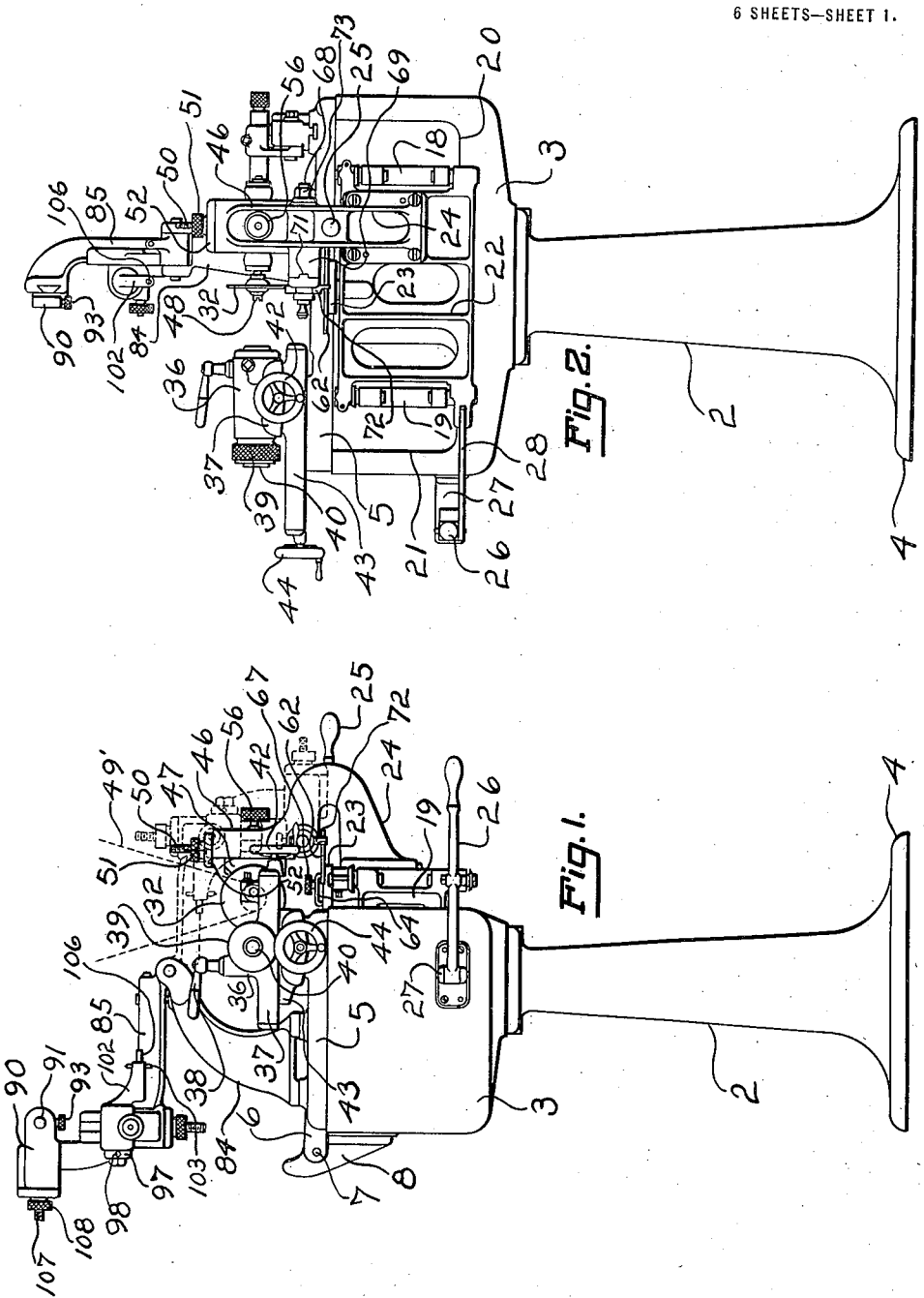

B. M. W. HANSON.
METAL REDUCING MACHINE.
APPLICATION FILED JUNE 8, 1916.
1,341,799.
Patented June 1, 1920.
6 SHEETS—SHEET 2.
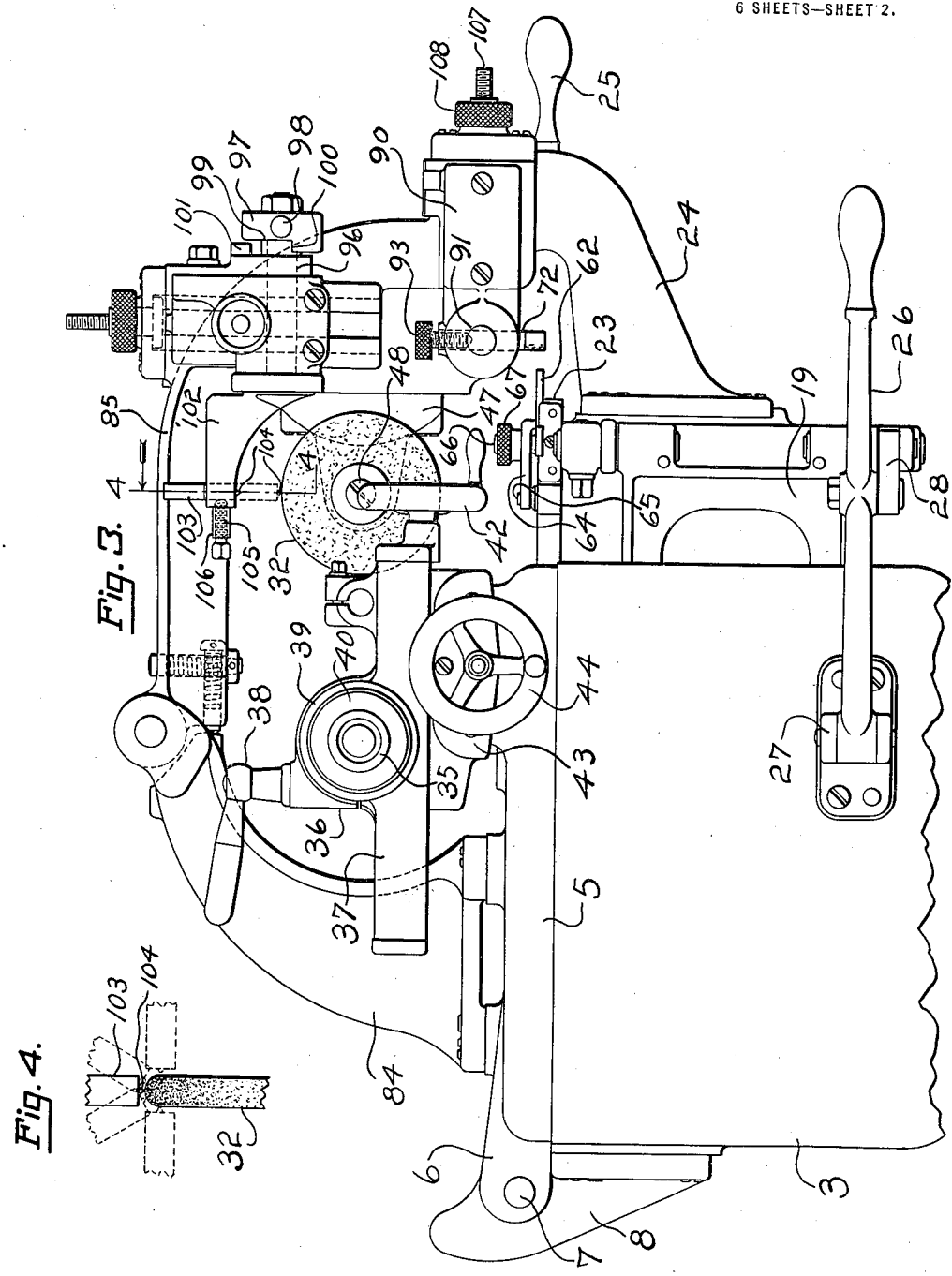
Inventor
B. M. W. Hanson
By Heath Sutherland
Attorney

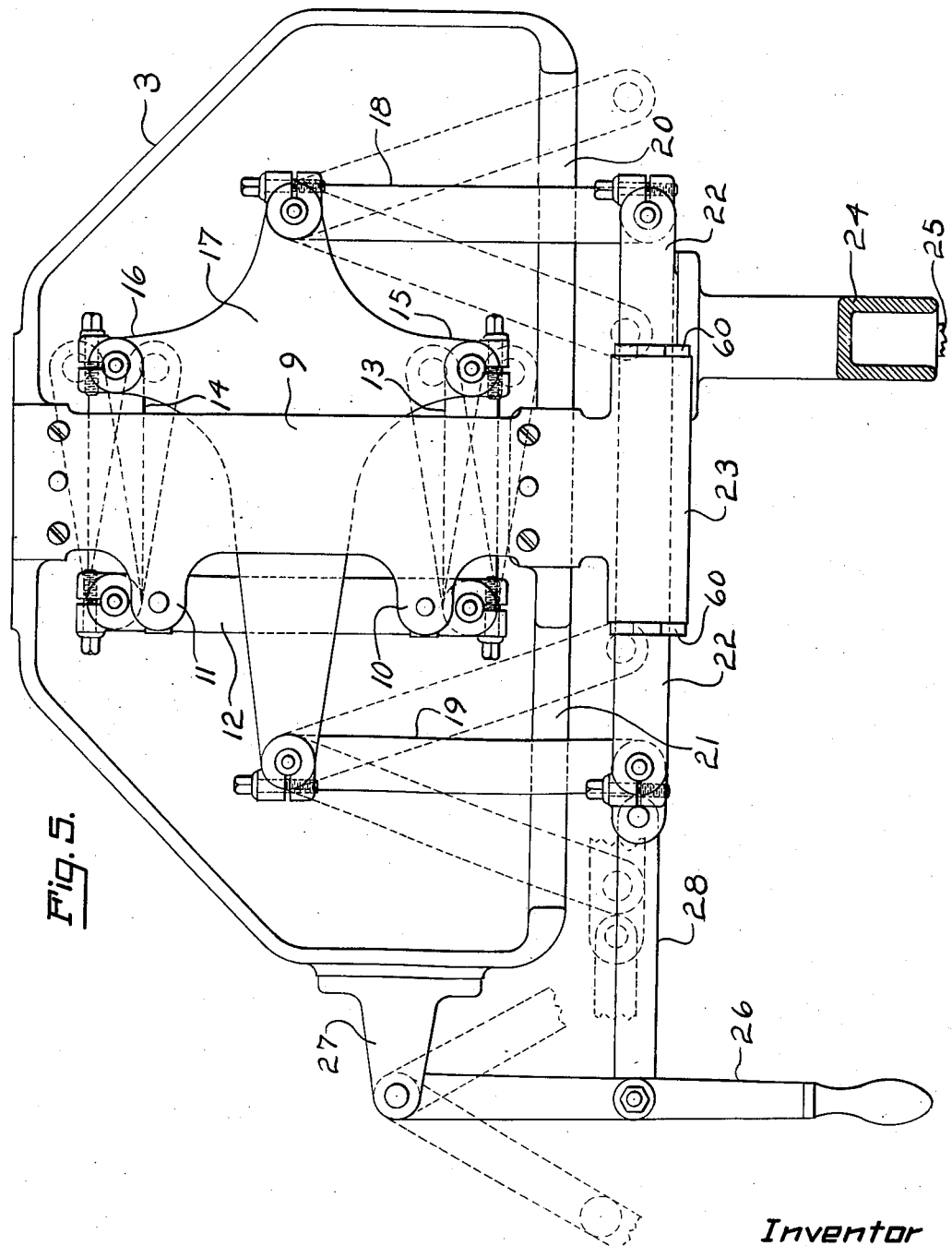

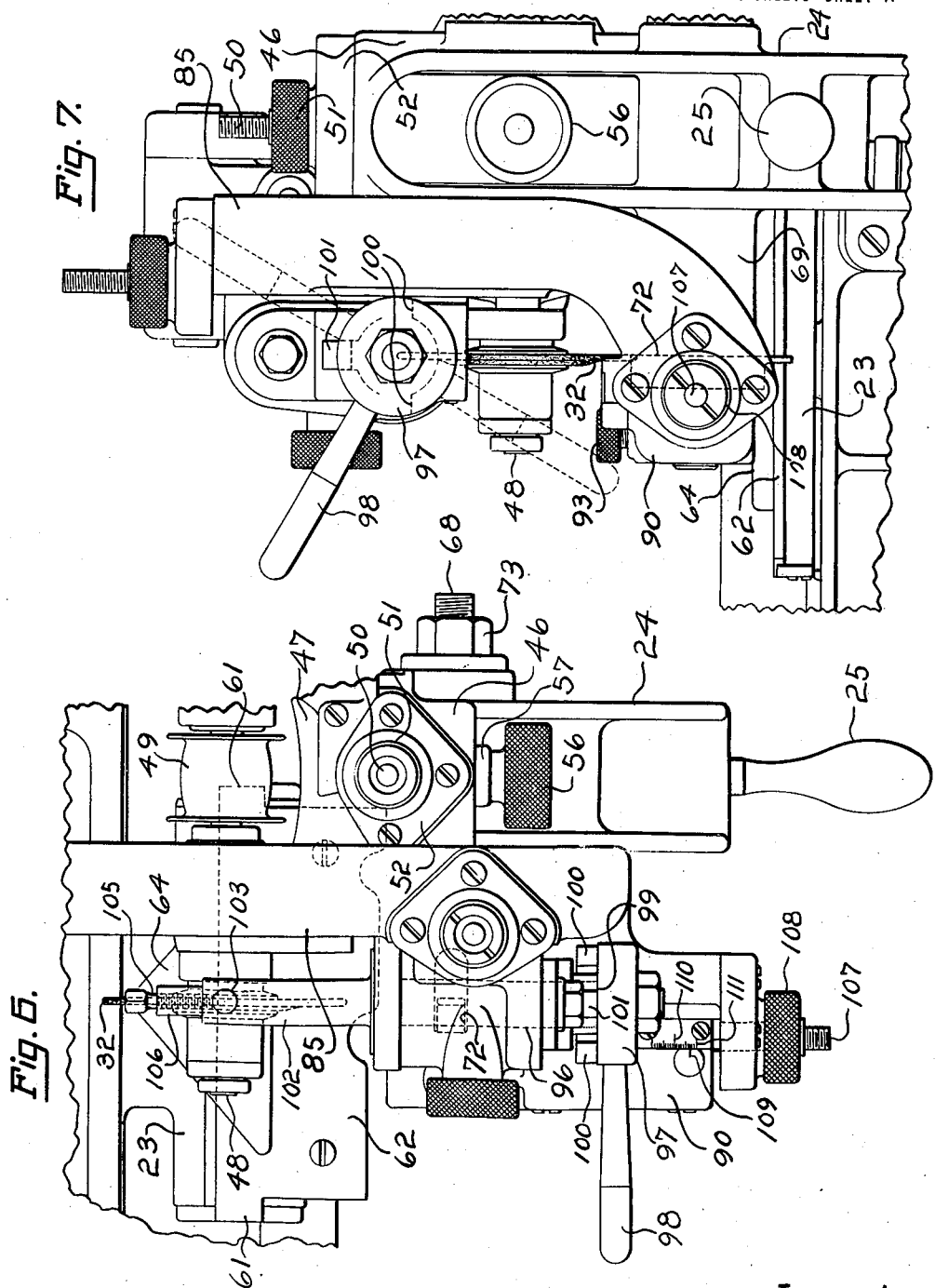

B. M. W. HANSON.
METAL REDUCING MACHINE.
APPLICATION FILED JUNE 8, 1916.

1,341,799.

Patented June 1, 1920.

Inventor:
B. M. W. Hanson,
By Attorney

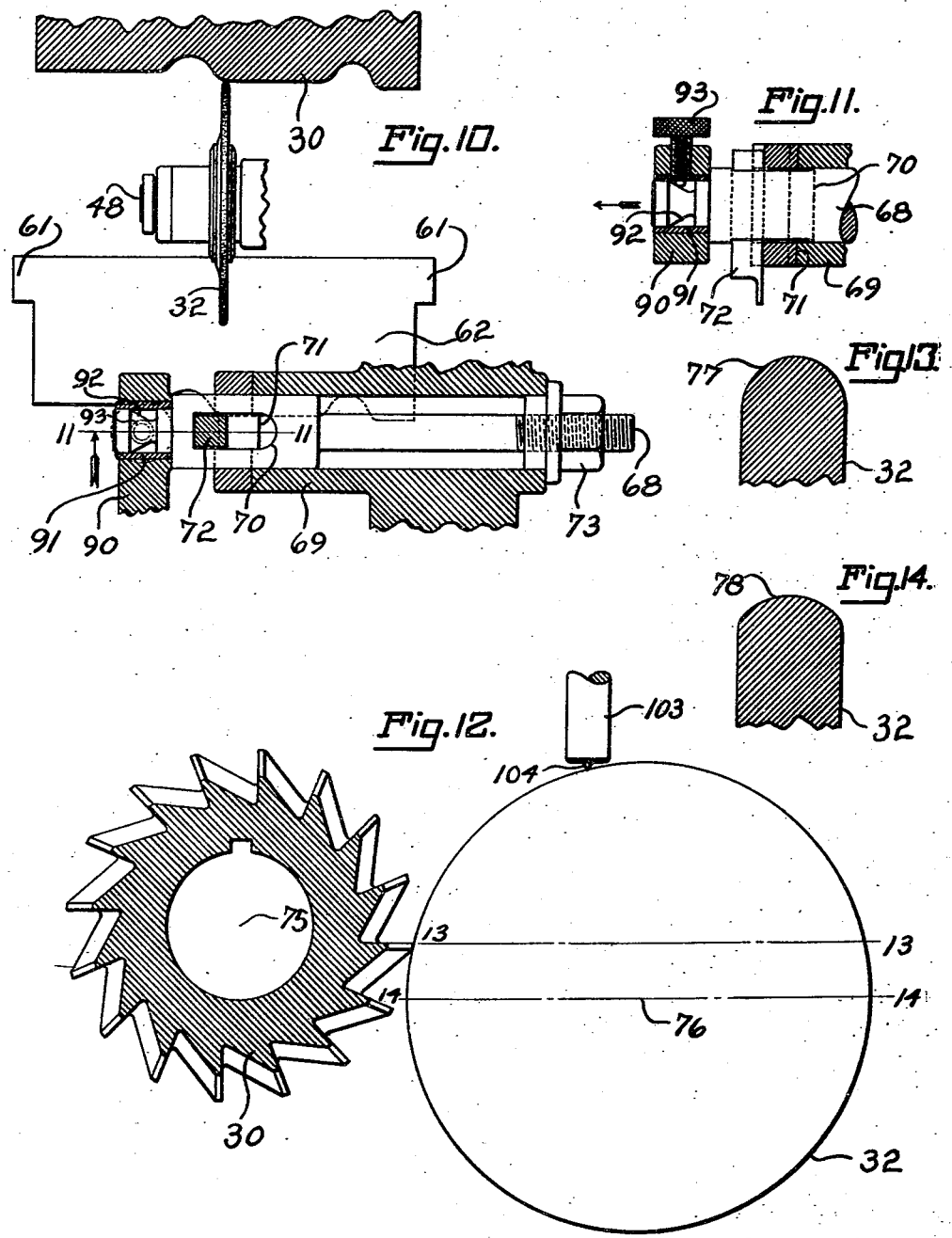

UNITED STATES PATENT OFFICE.

BENGT M. W. HANSON, OF HARTFORD, CONNECTICUT, ASSIGNOR TO PRATT & WHITNEY COMPANY, OF NEW YORK, N. Y., A CORPORATION OF NEW JERSEY.

METAL-REDUCING MACHINE.

1,341,799.     Specification of Letters Patent.     Patented June 1, 1920.

Application filed June 8, 1916. Serial No. 102,458.

*To all whom it may concern:*

Be it known that I, BENGT M. W. HANSON, a citizen of the United States, residing at Hartford, in the county of Hartford and State of Connecticut, have invented certain new and useful Improvements in Metal-Reducing Machines, of which the following is a specification.

A machine involving the invention comprises tool-holding means and work-holding means in conjunction with means for carrying one of the holding means for floating movement. Either of the holding means, as will be clear, may be thus carried, although in that form of embodiment of the invention which I have selected for illustration in the drawings accompanying and forming part of the present specification, the tool-holding means is thus mounted. This particular form of embodiment of the invention will be set forth fully in the following description. I do not restrict myself to this disclosure and I may depart therefrom in several respects within the scope of the invention defined by the claims following said description. The work and the tool may be of any suitable character. For instance, the work may be a milling-cutter, and in this event the tool is preferably of grinding type consisting for illustration of a rotary wheel of emery or other suitable abrading material. So far as certain features of the invention are concerned, the floating movement to which I have referred may be obtained in a variety of different ways, but in accordance with other features of the invention a pantographic carrier has important advantages and is preferred. The holding means whether it be the tool or the work holding means which floats, as I have considered the motion, is governed preferably by a former or a pattern. This former or pattern may be related with the tool and the work in any convenient manner, but where the tool is supported by the pantographic carrier and where the work is mounted on the frame, I prefer that the former be carried by the frame or at least relatively fixed with respect to the pantographic carrier. A former stud is mounted on the carrier being coöperative with the former to cause the tool to follow a path conforming to the contour of the former or pattern. A machine of the character set forth is quite flexible and in addition to this it is compact and its output accurate. When the machine is used for grinding, and when a wheel of emery or equivalent substance is provided for the purpose, it is desirable that the wheel be dressed and I provide a novel wheel and a novel means whereby this particular result can be accurately accomplished.

Referring to the drawings:

Figure 1 is a side elevation of a machine involving the invention showing the dressing means in inoperative and operative positions by full and dotted lines respectively.

Fig. 2 is a front view of the machine showing the dressing means in the inoperative position.

Fig. 3 is a side elevation of the upper portion of the machine showing the dressing means in the operative position and with the former stud out of engagement with the former.

Fig. 4 is a transverse section on the line 4—4 of Fig. 3, looking in the direction of the arrow, the full and dotted line positions showing the dressing tool in different positions.

Fig. 5 is a top plan view of the machine with the cap plates and the parts thereof and above removed.

Fig. 6 is a fragmentary top plan view.

Fig. 7 is a front view of the parts shown in Fig. 6.

Fig. 9 is a side elevation of the upper part of the machine with the top plate and swinging arm thrown back. This view is taken from the side opposite to that from which Fig. 1 is taken.

Fig. 10 is a fragmentary sectional plan view, the plane of the section passing through the work and a bolt which carries the former stud.

Fig. 11 is a vertical section on the line 11—11 of Fig. 10, looking in the direction of the arrow.

Fig. 12 is a diagram showing the relation of the work, the grinding wheel, and the dressing tool in both grinding and truing.

Fig. 13 is a sectional detail of the grinding wheel, the section being on the line 13 of Fig. 12.

Fig. 14 is a similar view, the section being on the line 14 of said Fig. 12.

Like characters refer to like parts throughout the several views, which are on different scales.

Figure 8:
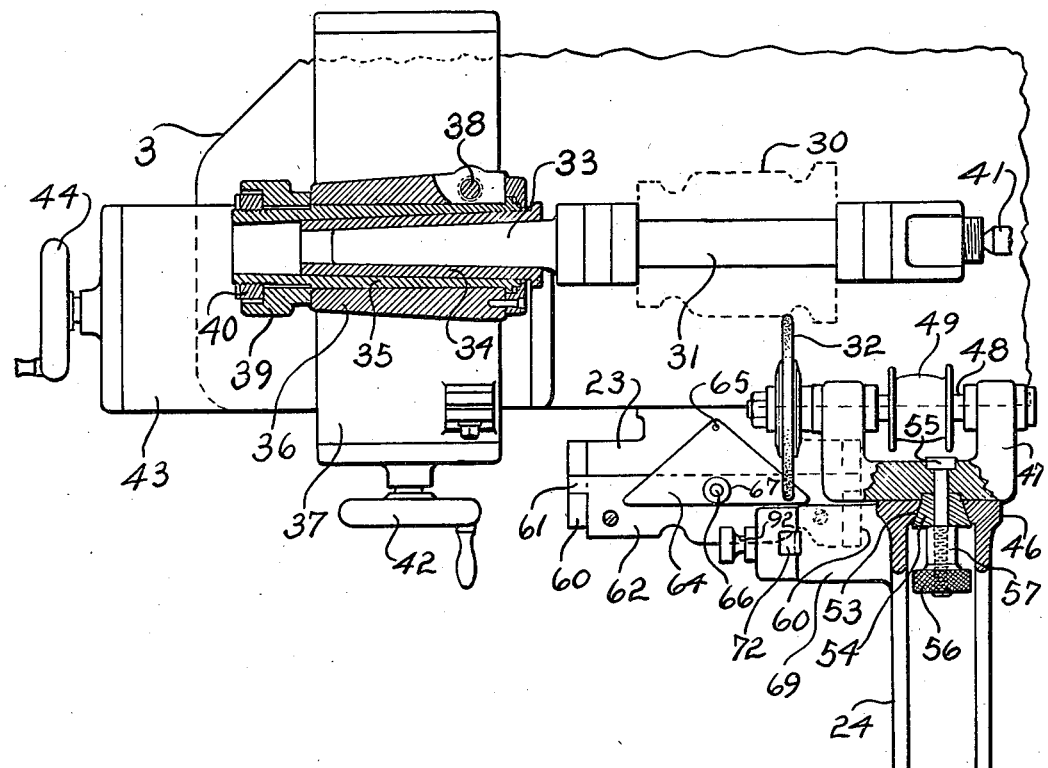
Fig. 8 is a fragmentary sectional plan view, the plane of the section passing through the work spindle and the wheel carrying slide.

The various parts of the machine may be sustained by any suitable framework, that shown including in its organization the column or upright 2 surmounted by the hollow head 3 suitably rigidly united as shown for example in Figs. 1, 2, 3 and 9. The two may be cast integral and the column may be provided with the supporting foot or base 4 adapted to rest on a floor or other foundation. The opening in the upper side of the hollow or chambered head 3 as shown is covered normally by the cap-plate 5 which is movable to provide ready access to the interior of the head. As represented the cap-plate is provided at its rear with an extension 6 pivoted as at 7 to a bracket as 8 fastened to the rear upper portion of the head and rising therefrom. When the cap plate is down, it rests on the upper side of the head 3 and closes the same. Owing to its hinged mounting, it can be swung up when desired to reach the interior of the head. Extending across the upper open side of the head 3 from front to rear thereof and fastened suitably to the head as by one or more screws is the bridge-piece 9. (See Fig. 5.) The said bridge-piece as represented is furnished between its ends with the laterally-extending ears 10 and 11 which overlie the hollow bearing member 12 situated in the hollow head 3 and extending from the rear portion toward the front portion thereof. To the opposite ends of the bearing member or support 12 are pivoted links 13 and 14 of practically similar length, these links being in the present case disposed in parallelism. Said links are also pivotally connected to the outwardly extending arms 15 and 16 of the cruciform member 17. To the ends of the cruciform member are pivoted the links 18 and 19 arranged in parallelism but transverse to the links 13 and 14. The two pairs of links in the present case are alined transversely of the head 3. The links 18 and 19 as represented extend forwardly from the cruciform member 17 and through slots or openings as 20 and 21 in the front wall of the head 3, being shown pivotally united to the connecting member 22 which is overlapped by the forwardly extending overhanging portion 23 of the bridge-piece 9. This connecting member 22 is shown provided with a rigid bracket 24 (see Fig. 3 for example) furnished with a handle 25 which can be grasped by the operator to impart a lateral movement to the connecting member 22. Longitudinal movement of said connecting member can be secured for instance by the lever 26 (Fig. 5) fulcrumed at its rear to an arm or projection 27 extending outward from the hollow head 3 and connected between its ends as by the link 28 to the adjacent end of the connecting member 22. The tool holding means is movable with this connecting member 22. Owing to the manner in which the latter is mounted and operable, it is clear that the tool can be made to follow any type of path which in the present case is horizontal but might be any other, as will be obvious. The two links 13 and 14, the cruciform or coupling member 17, the links 18 and 19 and the connecting member 22 present collectively a pantographic carrier. The parts 17 and 22 are adapted to float or change their positions bodily, and it follows that the tool or other part supported thereby similarly functions.

As will be clear the work and the tool of whatever nature the same may be are relatively universally movable, and in the present case this particular result is obtained by mounting the tool for floating movement, said tool being advantageously supported by a pantographic carrier, such as that already described. The plate 5 which I have already briefly described constitutes a suitable main support for the work which is assumed to be a milling cutter 30. For grinding the cutter 30 there is provided a rotatable grinding wheel 32 of emery or other suitable material. I will hereinafter set forth more in detail the mounting and mode of operation of the grinding wheel or tool 32, although it will be obvious that this grinding wheel is associated with the pantographic carrier for movement therewith. When the cutter has an integral shank this shank may be engaged with a sleeve 34 which is rotatable with a spindle 35 carried by a suitable bearing 36 on a cross slide 37. If the cutter has no shank but is provided with a central aperture the cutter may be mounted on an arbor 31 provided with a tapered portion 33 adapted to be engaged by the aforesaid sleeve 34. The bearing 36 is of divided form and is provided with the binder 38 adapted as familiar in metal-working machines to hold the spindle 35 in a rotatively or angularly adjusted position. Keyed or otherwise suitably connected to the outer end of the spindle 35 is a suitable manipulating-member as the knob 39 held in place on the spindle by a nut 40. By loosening the binder 38 the spindle 35 can be turned through the agency of the knob 39 to effect indexing of the work 30, and when as in the case of a milling-cutter a blade is positioned properly to be acted on by the tool or grinding member 32, the binder will be set to hold said spindle 35 in its adjusted position and in readiness for the particular blade to be ground. The tool or grinding wheel 32 in the present case traverses the blade of the cutter thus positioned in a direction longitudinally and laterally of the axis of the cutter 30. When a blade of the cutter has been ground, the tool will be cleared of the work, the cutter freed, indexed and then locked with a second cutter blade in position to be ground at which point the tool will traverse the second blade in the manner set forth, these operations continuing until all the blades are ground. For additional security if desired, one end of the arbor 31 may receive the center 41. This center 41 is carried by a tailstock bearing 41ª. The cross slide 37 is provided with suitable means for operating it as usual in metal-working machines of various kinds, said means including the hand wheel 42. By operating this hand wheel the slide 37 may be moved toward the rear or the front of the machine in accordance with the direction in which the hand wheel is turned. The tailstock bearing 41ª is carried by a tailstock slide 41ᵇ which is transversely adjustable in parallelism with the slide 37. After the cutter has been properly adjusted transversely by means of the slide 37, the slide 41ᵇ can be correspondingly adjusted. Preferably the bearing 41ª is adjustably connected with the slide 41ᵇ by means of the bolt 41ᶜ. With this construction it is possible for the slide 41ᵇ to be moved to bring the bearing approximately into alinement with the arbor and for the final adjustments to be then made by moving the bearing with respect to the slide. After these final adjustments have been made the bearing can be clamped in place by means of the bolt 41ᶜ. As illustrated the cross or auxiliary slide 37 to which the work is directly connected is carried by the main slide or carriage 43, said slide 43 having as will be clear the necessary ways for the superimposed slide 37. The swinging plate 5 in turn is provided with the requisite ways for the slide 43 which as shown has a movement from side to side of the machine. This slide 43 is provided with the necessary adjuncts including the hand wheel 44, for operating the same transversely of the machine. It will, of course, be clear that while two slides are shown, this may not always be necessary. As a matter of fact it is not necessary even to employ one, although the construction set forth has its advantages. With the construction shown the slides 37 and 44 after the work is connected with the upper slide, are operated to position the work to be acted on by the tool and after this the only thing requisite is the indexing of the work.

It will be remembered that I have described a handle 25 as one of the means for effecting the necessary manual operation of the hereinbefore described pantographic carrier. As is illustrated the handle is rigid with the bracket 24 fastened as by screws or bolts to the front link 22 of said pantographic carrier. The body of the bracket 24 (Figs. 6, 7 and 9) is practically of U-shape, standing approximately horizontally. From the upper branch of the U-shaped body rises the arm 46 against the inner face of which the yoke 47 is slidable. This yoke constitutes a suitable support for the spindle 48 with which the grinding wheel 32 hereinbefore described is rotative. It will be understood that a wheel 32 of any desired thickness can be selected and secured in place on the spindle. Obviously the thickness of the wheel must be determined to some extent by the contour of the cutter to be ground. If the cutter has deep depressions and sharp curves a narrow wheel must be used in order to follow the contour. The tool spindle 48 may be driven in any desirable manner, for instance by the band wheel 49 fastened thereto and adapted to be rotated by a suitable belt or band 49' (see dotted lines Fig. 1). As illustrated the yoke 47 is adjustable transversely of the planes in which the wheel is normally movable bodily, the adjustment in the present case being vertical. To move it up and down the feed screw 50 and nut 51 may be provided, said feed screw as shown being rigid with the tool spindle support or yoke 47, while the nut 51 has a swiveled connection with the cap-piece 52 fastened in some desirable manner to the upper end of the arm 46. From this it will be clear that the screw 50 does not rotate. The nut 51, however, does turn but is immovable in the direction of its axis of rotation. By turning the nut the support 47 can be adjusted to raise or lower through the intermediate parts, the grinding-wheel 32. The arm 46 has a vertically elongated slot 53, the side walls of which are beveled to be engaged by the correspondingly beveled sides of the clamping block 54, the inner end of which is socketed in the body of the spindle support 47. Extending through said body (Fig. 8) and also through the beveled locking or binding block 54 is the bolt 55 headed at its inner end and threaded at its outer to receive the nut 56 between which and the binding block the spacing sleeve 57 is situated. By turning the nut 56 to the left provided it be a right thread, the binding block 54 can be relatively backed to free the support 47 so that the latter can be raised or lowered in the manner already described, and when in an adjusted position the nut 56 will be turned to the right to maintain the adjustment.

In some cases it is desirable and actually necessary in fact, to provide a former or templet to guide or direct the tool or it might be the work for that matter, as will be inferred, along a predetermined path. Where the work is a milling-cutter this path would be defined by the outline of the former. In addition to this it is requisite in some cases that the cutter should be relieved, and I provide not only for securing this particular function, but I also and what is of the utmost importance provide for the proper and precise truing as required, of the wheel. It is conceivable in some cases that the machine could be used without a templet or former. Said templet or former when used may be of any suitable nature, depending upon the character of surface or contour to be ground or finished. This templet or former as shown is fixed, the pantographic carrier or equivalent means being equipped with a former pin or stud coöperative with the former or templet. The projecting portion 23 of the stationary bridge or tie piece 9 hereinbefore alluded to, has at its ends 60 adapted to snugly receive the projections 61 of a former 62 which fits flatwise against the projecting portion of the former holder 23 (Fig. 8). Pivoted to the rear part of the said carrier 23 is a clamping plate 64, the pivot being denoted by 65. Rising from said former-carrier 23 is a screw 66 which receives the nut 67, the rear edge of the former 62 being slotted to receive the screw when the former is positioned, the nut when turned home binding the clamping plate 64 substantially against the former 62, so that the latter is effectually held from movement. As will be clear the former is removably mounted, so that one of a different kind can be substituted for it. As a matter of fact the foregoing description is merely one of several convenient mounts for a former.

Extending through the bracket 24 transversely thereof (Figs. 9, 10 and 11) at about the junction of the vertical arm 46 with the upper branch of the U-shaped body of said bracket, is an elongated bolt 68 which extends through the outwardly projecting boss 69 constituting a part of said bracket. In the said bolt 68 is a slot 70 extending therethrough, the width of the slot equaling the width of a notch or slot 71 formed in the outer end of the boss or projection 69, both slots 70 and 71 being in the present case rectangular and being adapted to receive the square shank of the former stud 72, the operative part of the stud being round or cylindrical. The thickness of the operative part of the stud is the same as that of the wheel 32, and it is necessary to substitute a different stud when a wheel of different thickness is put in place. At the outer end the bolt 68 is threaded to receive the nut 73 by turning which to the right if the threads be right-hand ones, the pin or bolt 68 will be advanced so as to solidly and substantially clamp and hold the square shank of the forming device 72 in the two coinciding slots 70 and 71.

In the present case the outline or contour of the former 62 agrees with the outline or contour of the blade or cutter tooth to be ground. To thus grind a cutter tooth or blade in the direction of the length thereof the pantographic carrier hereinbefore described will be manipulated so as to bring the active or cylindrical portion of the former stud 72 into engagement with the former 62 near the entering end thereof. This will bring the tool 32, assumed to be rotating, into engagement with the entering end of the particular blade or tooth of the cutter 30 which is to be ground or reduced. The operator will then press the former stud 72 solidly against the pattern face of the former and will then cause the former stud to follow the operative face of the former, the stud or pin 72 being held firmly against the face of the former-stud which it longitudinally traverses the former-stud and necessarily the tool 32 controlled thereby following a path outline by the former, and thus grinding the blade or tooth of the cutter. The grinding tool 32 passes free of the blade or tooth just about the time the former-stud 72 reaches the leaving end of the former. The former generally has at its opposite ends ineffective portions usually made flat, to guide the former device toward and then from the effective or operative portion of the former which is that part thereof which corresponds in outline to the shape of the blade or tooth being ground.

In the case of a milling-cutter the outer edge surface of each blade or tooth is to be longitudinally ground. Each of said surfaces has a cutting edge and a back relief portion as best represented in Fig. 12. It is, therefore, not only necessary that the tool or grinding wheel should be so presented to a blade that is being ground, as to provide for the grinding or reducing of this cutting edge and the relief portion of the blade as well, but that the grinding wheel can when required be accurately trued with the aid of a diamond or analogous dressing tool. The peripheral portion of the wheel which is against the cutting edge of a blade during the reducing operation, is intersected by a plane in parallelism or approximately in parallelism with the axis of the wheel but separate therefrom. This is to say the wheel is offset with respect to the cutter, the amount of off-set depending upon the amount of clearance of the cutting blade or other part being ground. This is shown diagrammatically in said Fig. 12 wherein the numeral 75 denotes the axis of the cutter, while the numeral 76 designates the center or axis of rotation of the grinding wheel. It will be noticed that the center 76 as shown is below the center 75 owing to which condition when the periphery of the grinding wheel is in contact with a cutter blade, there is provision for relief and also for grinding the cutting edge of the blade. The line of contact between the wheel and cutting edge of the blade is intersected in the illustration given by a plane indicated by the line 13 in parallelism as I have already observed with the axial plane indicated by the line 14. Where the plane 13 intersects the periphery of the grinding wheel or that part which acts against the cutting edge of a cutter blade, the periphery of the wheel is semi-circular (being as represented an exact half circle) as denoted by 77 in Fig. 13. That part of the periphery of the grinding wheel 32, however, which is intersected by the radial plane 14 is semi-elliptical as designated by 78 in Fig. 14. The transverse semi-circular part of the wheel periphery therefore, is against the cutting edge of a blade to accurately reduce said edge. It is consequently the edge-grinding part of the wheel 32 which should be trued as will hereinafter appear. While the center 76 is below the center 75 it might be above it for an oppositely formed or positioned cutter. It is also proper to state that the grinding wheel 32 is dressed transversely, the dressing being off-center. With the arrangement shown that part of the periphery of the wheel is dressed which is presented to the cutting edge of the tool.

Rising from the top plate or cover member 5 is the forwardly and upwardly curved arm 84 to the free end of which is pivoted the arm 85, the front end of which as shown is curved in a downward direction. This arm 85 is provided at its free end with slide-ways to receive the slide 90 (Figs. 3, 6 and 7 for example) having at its inner end the eye 91 to removably receive the bolt 68 to which I have hereinbefore referred to thus couple the arm 85 and grinding wheel pantographic carrier to which I have hereinbefore referred. That part of the bolt 68 which is received within the eye 91 is tapered downwardly and inwardly as at 92 (Figs. 10 and 11) and when the connection between the slide 90 and swinging arm 85 is effected, it is maintained in some suitable manner as by the screw 93 threaded through the eye 91 and the cone-pointed end of which is adapted to ride along the conical surface 92 of the bolt 68 to draw the parts together and maintain in a substantial solid manner the coupled relation between the arm 85 and slide 90. This slide 90 when coupled to the pantographic carrier is adapted to accurately position the grinding wheel with respect to the dressing or truing device, all as will be hereinafter more particularly set forth. It is clear that when I off-set the grinding wheel it is essential that the dressing tool should be correspondingly off-set. The off-setting of the tool with respect to the work in the present case is obtained by the vertical movement of the grinding wheel, while the relative adjustment of the grinding wheel and truing device is obtained in the construction represented by a horizontal movement of the grinding wheel, the two movements being therefore in transverse directions and practically at right angles to each other.

Figure 9:
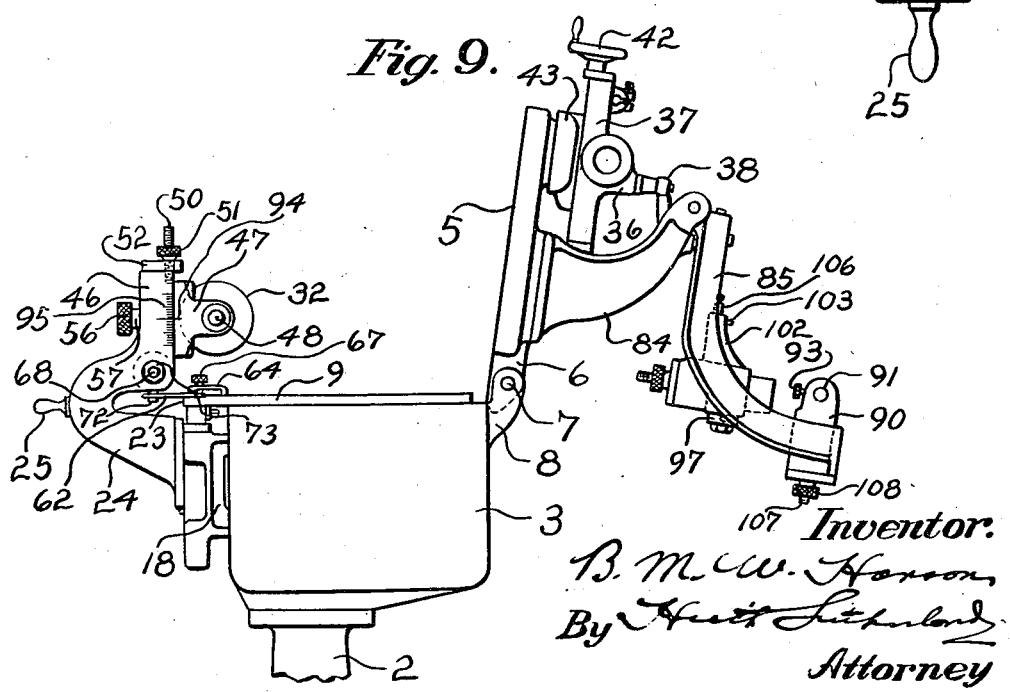

It will be remembered that I have described the fact that the grinding wheel 32 is supported by a slide 47 and that this slide 47 is vertically adjustable through the agency of the feed nut 51 and screw 50 after the binder or clamping member 54 has freed the slide. On the slide 47 is an index mark 94 coöperative with the scale 95 on the relatively fixed arm 46 as shown in Fig. 9. When the index mark 94 is opposite the zero mark of the scale 95 this signifies that the grinding wheel 32 is in neutral position which in the organization shown is when the centers 75 and 76 are horizontally alined. By moving the index mark 94 away from the zero mark of the scale 95 the grinding wheel 32 is off-set with respect to the work so as to obtain a relief in the manner described, the amount of movement up or down of the grinding wheel governing the degree of relief which is indicated by the scale 95. If the grinding wheel 32 is moved from the neutral position a certain distance, it is obvious in order to secure accuracy and preciseness in truing that there should be a corresponding relative adjustment between the grinding wheel and the truing device, and as will be inferred, this relative adjustment is obtained by the movement of the grinding wheel.

Extending through a bearing in the swinging arm 85 above the slide 90 is a rocking pin 96 to the outer end of which is fixed the hub 97 having a manipulating arm 98. On the inner side the hub 97 is cut away as at 99 to produce two shoulders separated from each other a distance of 180 degrees, these shoulders 100 being coöperative with the stop 101 fixed to the arm 85 as shown best in Fig. 7. From this it will be clear that the pin 96 through the operation of the arm 98 can be swung through one half of a circle which represents the transverse form of the peripheral or grinding portion of the wheel 32. Rigid with the inner end of the pin 96 is a bent arm 102 which receives within it the cylindrical shank 103 of the dressing tool or diamond 104 which is rigidly set into the lower or front end of the shank in a rigid manner as is usual. The shank 103 is longitudinally adjustable for different radii of peripheries, the adjustment being maintained by a screw 105 carried by the projection 106 of the arm 102 and engaging said shank. In dressing the wheel the pin 96 is oscillated by hand so as to move the diamond from one side of the periphery to the other side thereof, while the grinding wheel is being rotated. Connected with the slide 90 in a rigid manner for instance is the screw 107 which receives the nut 108 having a swiveled connection with the arm 85, so that when the nut 108 is turned the slide 90 can be adjusted. It is usual to first adjust the wheel 32 in the manner already set forth to obtain the necessary off-set of the wheel which is governed by the particular cutter or other part being ground, and after this is obtained the necessary relative adjustment between the wheel 32 and the truing device 104 is effected. If in the present case the slide 47 is adjusted to obtain a prescribed off-set, a corresponding adjustment between the grinding wheel 32 and the truing or dressing tool 104 should be made. For this purpose the slide 90 is furnished with an index mark 109 coöperative with the scale 110, the zero mark of which is denoted by 111. When the index mark 109 is opposite the zero mark 111 of the scale 110, this will indicate that the dressing tool 104 is intersected by a radial line passing through the axis of rotation of the wheel 32. By moving the slide 90 inward through the rotation of the nut 108 a distance corresponding to the prior adjustment of the slide 47, the diamond 104 can be adjusted through the described parts to position said diamond to dress the off-set part of the grinding wheel.

In Fig. 12 which of course is a diagram I have shown the wheel 32 in grinding relation with the work 30 and at the same time have shown the diamond 104 in dressing relation with the wheel 32. This condition ordinarily does not exist in practice for the wheel 32 is trued when out of contact with the work. To save unnecessary illustration, however, and in view of the further fact that the view in question is a diagram, both relations have been illustrated therein. The former stud or pin 72 in addition to functioning as such also constitutes a gage, the shank of said former stud in the present instance functioning in this way, said shank as already noted, being rectangular in cross section. The width of the shank of the former stud is definitely related to the thickness of the operative part thereof and to the thickness of the wheel so that the end of the bolt 68 is made to project outward to a greater or less extent in accordance with the wheel and stud selected for use. In this way the shank of the stud serves as a gage.

When the former stud 72 is clamped in position in the manner hereinbefore described, this will center the peripheral portion of the wheel 32 and the dressing diamond 104, so that the diamond will as shown for instance by full lines in Fig. 4 commence and finish its dressing of the tool exactly where the circular ends of the periphery transversely thereof merge into the flat side faces of the wheel. In view of this condition the wheel cannot be under cut on one side and bulged on the other or vice versa, but the terminal portions of the curve will merge precisely into the flat side faces of the wheel.

I do not herein claim as part of my invention the detailed construction of the wheel dressing mechanism as this mechanism is presented in my copending application for wheel dressing mechanisms, Serial No. 247,636, filed July 31, 1918, the said application constituting as to part of its subject matter a continuation of this present application. I do, however, herein claim the wheel dressing mechanism so far as it is coöperatively combined with the other parts of the machine.

What I claim is:

1. The combination of work holding means, tool holding means, and a pantographic carrier on which one of said holding means is mounted.

2. The combination of work holding means, a pantographic carrier, tool holding means on the pantographic carrier, and a former and a coöperating former stud, one carried by the pantographic carrier and the other supported independently of the carrier, the former and stud coacting to cause the tool to traverse a predetermined path.

3. The combination of work holding means and tool holding means for supporting the work and the tool for movement about axes, a pantographic carrier supporting one of the holding means, and a former and a former stud, one on the carrier and the other supported independently of the carrier, the former and the stud coacting to cause a cut by the tool and the work along a predetermined path.

4. The combination of means for supporting and effecting the indexing of a milling cutter, a pantographic carrier, a rotary grinding wheel supported by the carrier, and a former and former stud, one fixed and the other connected with the carrier, said former and stud coacting to cause the grinding wheel to follow the surface of a tooth of the cutter.

5. The combination of a pair of links, a cruciform member the side arms of which are pivoted to said links, a second pair of links pivoted to the cruciform member and disposed at right angles to the other links, a connecting member joined to the other pair of links, and work holding and tool holding means one of which is supported by said connecting member.

6. The combination of a standard provided with a hollow head, a pantographic carrier mounted in the head and extending therefrom, and tool holding and work holding means one of which is supported by the pantographic carrier.

7. The combination of a hollow supporting member, a pantographic carrier supported within and extending from the hollow supporting member, and tool holding and work holding means, one of the holding means being supported by the pantographic carrier and the other by the hollow supporting member.

8. The combination of a standard having a hollow head, a pantographic carrier supported in and extending from said head, tool holding means on the extending portion of the pantographic carrier, work holding means surmounting the head, and a coöperating former and former stud governing the movement of the pantographic carrier, one of which is supported by the head and the other of which is connected with said carrier.

9. The combination of a supporting head, a bridge-piece extending across the head, a bearing member connected with the bridge-piece, a pair of links pivoted to the bearing member, a second pair of links transverse to the other pair of links, means connecting the two pairs of links, a connecting member connecting the second pair of links, and means supported by the second connecting member for rotatively sustaining a tool.

10. The combination of a hollow head, a bridge-piece extending across the open side of the head from front to rear, a bearing member connected with the bridge-piece, a pair of links extending from the bearing member, a second pair of links transverse to the other pair of links, means located below the bridge-piece for operatively connecting the two pairs of links, a connecting member connecting the second pair of links, and a rotary grinding wheel carried by the connecting member.

11. The combination of a holder for a milling cutter adapted to permit the cutter to be turned about its axis, a bodily movable grinding wheel having its axis substantially parallel to the cutter axis, means for holding the wheel in parallelism while being moved, a former and former stud one fixed and the other movable for guiding the wheel in a fixed path along the surface of the cutter, and means for effecting relative adjustment between the cutter holder and the former longitudinally of the cutter axis whereby the position of the cutter and the path of movement of the wheel are properly correlated.

12. The combination of a holder for a milling cutter adapted to permit the cutter to be turned about its axis, a bodily movable grinding wheel having its axis substantially parallel to the cutter axis, means for holding the wheel in parallelism while being moved, a former and former stud one fixed and the other movable for guiding the wheel in a fixed path along the surface of the cutter, and means for effecting relative adjustment between the cutter holder and the former transversely of the cutter axis to bring the wheel and the cutter into engagement.

13. The combination of a holder for a milling cutter adapted to permit the cutter to be turned about its axis, a bodily movable grinding wheel having its axis substantially parallel to the cutter axis, means for holding the wheel in parallelism while being moved, a former and former stud one fixed and the other movable for guiding the wheel in a fixed path along the surface of the cutter, and means for effecting relative adjustment between the cutter holder and the former both longitudinally and transversely of the cutter axis whereby the position of the cutter and the path of movement of the wheel are properly correlated and whereby the cutter and the wheel are brought into engagement.

14. The combination of a slide provided with means for rotatively supporting work, a pantographic carrier, means for rotatively supporting a grinding wheel on the pantographic carrier, a former, and a coöperating former stud, one supported by the pantographic carrier and the other supported independently of the said carrier, and means whereby the pantographic carrier can be operated to cause the former stud to relatively traverse the former and thereby cause the grinding wheel to act on the work along a given path extending approximately in the direction of the axis of rotation of the work.

15. The combination of a slide, a second slide on the first slide, means on the second slide for supporting and indexing a milling cutter, a pantographic carrier, a fixed former, means on the pantographic carrier for supporting a grinding wheel for rotation, and a former stud on said carrier to traverse the former and thus cause the grinding wheel to follow the surface of a tooth of the cutter.

16. The combination of a holder for an arbor carrying a milling cutter, a bodily movable grinding wheel having its axis substantially parallel to the cutter axis, means for holding the wheel in parallelism while being moved, a former and former stud one fixed and the other movable for guiding the wheel in a fixed path along the surface of the cutter, means for adjusting the holder transversely of the cutter axis, and a tailstock adjustable transversely of the cutter axis and adapted to support the cutter carrying arbor.

17. The combination of a holder for an arbor carrying a milling cutter, a bodily movable grinding wheel having its axis substantially parallel to the cutter axis, means for holding the wheel in parallelism while being moved, a former and former stud one fixed and the other movable for guiding the wheel in a fixed path along the surface of the cutter, means for adjusting the holder transversely of the cutter axis, a tailstock slide adjustable transversely of the cutter axis, and a tailstock bearing adjustably mounted on the slide and adapted to support the cutter carrying arbor.

18. The combination of a holder for a milling cutter, a bodily movable grinding wheel having its axis substantially parallel to the cutter axis, means for holding the wheel in parallelism while being moved, a former and former stud one fixed and the other movable for guiding the wheel in a fixed path along the surface of the cutter, and a pivoted plate on which the cutter holder is mounted independently of the grinding wheel.

19. The combination of a hollow head provided with a movable top, a pantographic carrier supported in the head and extending therefrom, tool holding means on the exterior portion of the pantographic carrier, and work holding means on the top.

20. The combination of work holding means, a pantographic carrier, a grinding wheel rotatively supported by the pantographic carrier, and a former and a former stud jointly governing the movement of the pantographic carrier, the active part of the stud being circular and its radius being the same as the transverse radius of the periphery of the grinding wheel.

21. The combination of a holder for a milling cutter, a bodily movable rotatable spindle having its axis substantially parallel to the cutter axis, means for holding the spindle in parallelism while being moved, means for securing to the spindle any one of several grinding wheels having different thicknesses, a relatively fixed former, and means bodily movable with the spindle for holding in coöperative relation with the former a former stud having its operative part of the same thickness as that of the wheel selected.

22. The combination of a grinding wheel, carrying means for the grinding wheel provided with a bearing, a former and a coöperating former stud for guiding the grinding wheel, and a bolt extending through the bearing in the carrying means, the bolt being furnished with a nut and being slotted to receive the shank of the former stud.

23. The combination of means for supporting work, a grinding wheel to act on the work, carrying means for the grinding wheel, a former and a coöperating stud for controlling the movement of the grinding wheel, and means for effecting relative transverse adjustment between the wheel and the work.

24. The combination of work holding means, a rotary grinding wheel, means for supporting the grinding wheel for bodily movement in parallelism, and independent means for effecting relative adjustments between the grinding wheel and the work transversely of the planes of parallel movement.

25. The combination of a pantographic carrier, a grinding wheel supported by said pantographic carrier, and means for effecting the adjustment of the grinding wheel in transverse directions.

26. The combination of work holding means, tool holding means, and a pantographic carrier on which one of said holding means is mounted, one of said holding means being adjustable with respect to the other to permit the off-setting relatively of the work and the tool.

27. The combination of work holding means, a pantographic carrier, a grinding wheel rotatively supported by the pantographic carrier, and a former for guiding the grinding wheel along a predetermined path during its operation on the work, the grinding wheel being adjustable on the pantographic carrier to effect relieving of the work.

28. The combination of a pantographic carrier having an upright arm, a slide movable against said arm, a binder on the arm to bind the slide in an adjusted position, and a grinding wheel rotatively supported by said slide.

29. The combination of a pantographic carrier provided with a bearing having a slot, the side walls of which are beveled, a slide to move against said bearing, a bolt extending through the slide a binder, the sides of which are beveled to fit the side walls of said slot and through which the bolt extends, a nut on the bolt to set the binder, and a grinding wheel rotatively supported by said slide.

30. The combination of means for supporting a milling cutter in fixed position, and a grinding wheel movable longitudinally along the outer face of a tooth of the milling cutter to thus grind an edge and a relief, that part of the grinding wheel which acts to grind the edge being intersected by a plane separated from and parallel with the axis of the wheel.

31. The combination of means for supporting a milling cutter in fixed position, a grinding wheel movable longitudinally along the outer face of a tooth of the milling cutter to thus grind an edge and a relief, that part of the grinding wheel which acts to grind the edge being intersected by a plane separated from and parallel with the axis of the wheel, and a carrier for the grinding wheel serving to hold it in parallelism during movement along the face of the tooth.

32. The combination of means for supporting a milling cutter, means for supporting a grinding wheel in coöperative relation with the outer face of a tooth of the cutter to thus grind an edge and a relief, the grinding wheel being in engagement with the edge of the tooth at a plane separated from and parallel with the axis of the wheel and the periphery of the wheel being semi-circular in cross section at the said plane, and means permitting relative longitudinal movement between the cutter and the wheel and serving to hold them with their axes approximately in parallelism during such movement.

33. The combination of means for supporting a milling cutter in fixed position, and a grinding wheel movable longitudinally along the outer face of a tooth of the cutter to thus grind an edge and a relief, the grinding wheel being in engagement with the edge of the tooth at a plane separated from and parallel with the axis of the wheel and the periphery of the wheel being semi-circular in cross section at the said plane.

34. The combination of means for supporting a milling cutter in fixed position, a grinding wheel movable longitudinally along the outer face of a tooth of the cutter to thus grind an edge and a relief, the grinding wheel being in engagement with the edge of the tooth at a plane separated from and parallel with the axis of the wheel and the periphery of the wheel being semi-circular in cross section at the said plane, and a former and former stud for guiding the wheel, the cross sectional contour of the stud being semi-circular and of the same radius as the cross sectional contour of the wheel at the said parallel plane.

35. The combination of a main frame, means on the main frame for supporting a cutter in fixed position, a grinding wheel movable along the face of the cutter and movable forward and backward to follow the cutter contour, means for supporting the grinding wheel and for holding it in parallelism while being moved, a wheel dressing mechanism movable to or from an operative position, and means for locking the grinding wheel support in a position to hold the wheel in a predetermined position in operative relation to the dressing mechanism.

36. The combination of a main frame, means on the main frame for supporting a cutter in fixed position, a grinding wheel movable along the face of the cutter, means for supporting the grinding wheel and for holding it in parallelism while being moved, a wheel dressing mechanism movable to or from an operative position, and means for connecting the grinding wheel support to the dressing mechanism when the latter is in operative position thus holding the grinding wheel in position to be dressed.

37. The combination of a main frame, means on the main frame for supporting a cutter in fixed position, a grinding wheel movable along the face of the cutter, means for supporting the grinding wheel and for holding it in parallelism while being moved, a wheel dressing mechanism connected to the main frame and movable to or from an operative position, and means for connecting the grinding wheel support to the dressing mechanism when the latter is in operative position thus holding the grinding wheel in position to be dressed.

38. The combination of a pantographic carrier provided with means for rotatively supporting a grinding wheel, said pantographic carrier having a projecting portion provided with a tapered part, and a wheel dressing mechanism having a tool adapted to dress the grinding wheel, the said mechanism also having a seat adapted to receive the projecting portion of the wheel carrier and a screw tapped through the seat to engage the said tapered part.

39. The combination of work holding means and tool holding means, the tool holding means being adapted to support a grinding wheel for rotary movement, means for carrying one of the holding means for movement bodily, and a former and a coöperating former stud to govern the movement of the carrying means, the former stud constituting a gage to define the position of the grinding wheel.

40. The combination of work holding means, a pantographic carrier, means on the pantographic carrier for supporting a grinding wheel for rotation, and a former and a coöperating former stud to govern the motion of the pantographic carrier, the former stud constituting a gage to locate the grinding wheel.

41. The combination of means for supporting a cutter in fixed position, a grinding wheel movable along the face of the cutter, means for supporting the grinding wheel and for holding it in parallelism while being moved, a former and a former stud for guiding the wheel in a fixed path, a wheel dressing mechanism movable to or from an operative position, means for connecting the grinding wheel support to the dressing mechanism when the latter is in operative position, and a device whereby the former stud serves as a gage to determine the position of the wheel support thus placing the grinding wheel in position to be dressed.

42. The combination of means for supporting a cutter in fixed position, a bodily movable rotatable spindle, means for supporting the spindle and for holding it in parallelism while being moved, means for securing to the spindle any one of several grinding wheels having different thicknesses, a relatively fixed former, means bodily movable with the spindle for holding in coöperative relation with the former a former stud having its operative part of the same thickness as the grinding wheel and having its shank of a different related thickness, a wheel dressing mechanism movable to or from an operative position, means for connecting the spindle support to the dressing mechanism when the latter is in operative position, and means whereby the shank of the former stud serves as a gage to determine the position of the support with respect to the dressing mechanism thus placing the grinding wheel in position to be dressed.

43. The combination of means for supporting a cutter in fixed position, a bodily movable rotatable spindle, means for supporting the spindle and for holding it in parallelism while being moved, means for securing to the spindle any one of several grinding wheels having different thicknesses, a relatively fixed former, means bodily movable with the spindle for holding in coöperative relation with the former a former stud having its operative part of the same thickness as the grinding wheel and having its shank of a different related thickness, a wheel dressing mechanism movable to or from an operative position, a bolt on the spindle support for connecting the support to the dressing mechanism when the latter is in operative position, and means whereby the shank of the former stud serves as a gage to determine the position of the bolt with respect to the support thus placing the grinding wheel in position to be dressed.

44. The combination of a pantographic carrier, a slide on said pantographic carrier, a grinding wheel rotatively supported by said slide, and a member provided with a slide connectible at will with the pantographic carrier, the two slides being movable transversely of each other.

45. The combination of means for supporting a cutter in fixed position, a grinding wheel movable along the face of a tooth of the cutter and positioned to engage the edge of the tooth at a plane separated from and parallel with the wheel axis, means for supporting the grinding wheel and for holding it in parallelism while being moved, and a wheel dressing mechanism having a relatively movable tool adapted to engage the wheel at a plane parallel with the axis and at the same distance therefrom as the plane of engagement of the wheel with the cutter.

46. The combination of means for supporting a cutter in fixed position, a grinding wheel movable along the face of a tooth of the cutter and positioned to engage the edge of the tooth at a plane separated from and parallel with the wheel axis, means for supporting the grinding wheel and for holding it in parallelism while being moved, and a wheel dressing mechanism movable to or from an operative position and having a relatively movable tool adapted to engage the wheel at a plane parallel with the axis and at the same distance therefrom as the plane of engagement of the wheel with the cutter.

47. The combination of means for supporting a cutter in fixed position, a grinding wheel movable along the face of a tooth of the cutter and positioned to engage the edge of the tooth at a plane separated from and parallel with the wheel axis, means for supporting the grinding wheel and for holding it in parallelism while being moved, and a wheel dressing mechanism movable to or from an operative position and having a tool adapted to engage the wheel, means for connecting the grinding wheel support to the dressing mechanism to hold the tool at a plane parallel with the wheel axis and at the same distance therefrom as the plane of engagement of the wheel with the cutter.

48. The combination of means for supporting a cutter in fixed position, a grinding wheel movable along the face of a tooth of the cutter, means for supporting the grinding wheel and for holding it in parallelism while being moved, means for adjusting the wheel transversely of its planes of parallel movement to cause it to engage the edge of the tooth at a plane parallel with the wheel axis and at any desired distance therefrom, a wheel dressing mechanism movable to or from an operative position and having a relatively movable tool adapted to engage the wheel, and means for adjusting the tool to cause it to engage the wheel at a plane parallel with the axis and at the same distance therefrom as the plane of engagement of the wheel with the cutter.

49. The combination of means for supporting a cutter in fixed position, a grinding wheel horizontally movable along the face of a tooth of the cutter, means for supporting the grinding wheel and for holding it in parallelism while being moved, means for adjusting the wheel vertically to cause it to engage the edge of the tooth at a plane parallel with the wheel axis and at any desired distance therefrom, a wheel dressing mechanism movable to or from an operative position and having a relatively movable tool adapted to engage the wheel, and means for connecting the grinding wheel support to the dressing mechanism including a slide carried by the dressing mechanism for adjusting the wheel support to cause the tool to engage the wheel at a plane parallel with the axis and at the same distance therefrom as the plane of engagement of the wheel 10 with the cutter.

In testimony whereof I affix my signature in presence of two witnesses.

BENGT M. W. HANSON.

Witnesses:
W. R. STORRS,
H. E. BAILEY.